No. 31,795.                           PATENTED MAR. 26, 1861.
Z. FEAGAN.
HEMP CART.
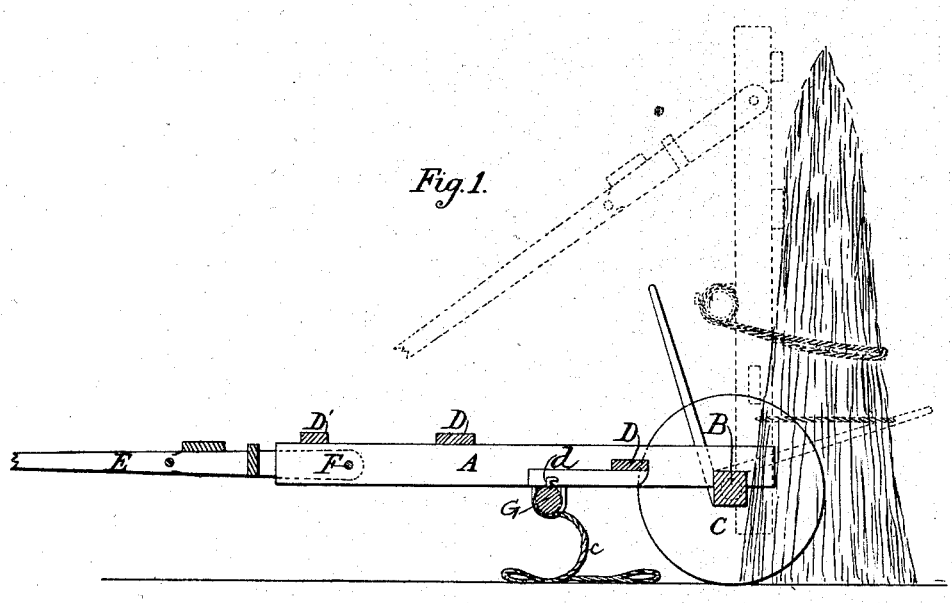
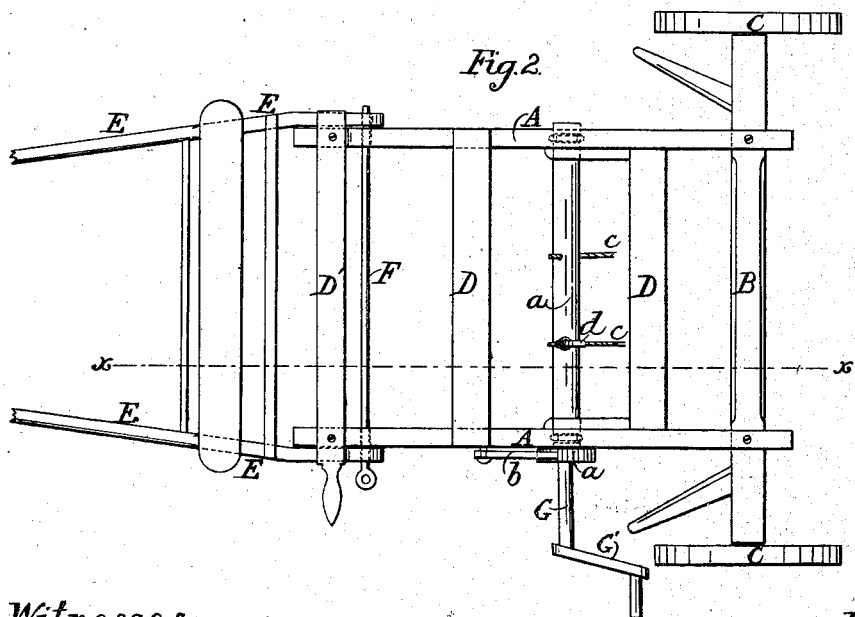
Witnesses:                                   Inventor:

UNITED STATES PATENT OFFICE.

Z. FEAGAN, OF PALMYRA, MISSOURI.

HEMP-CART.

Specification of Letters Patent No. 31,795, dated March 26, 1861.

*To all whom it may concern:*

Be it known that I, Z. FEAGAN, of Palmyra, in the county of Marion and State of Missouri, have invented new and Improved Hemp-Carts; and I do hereby declare that the following is a full, clear, and exact description thereof, reference being had to the accompanying drawings, making a part of this specification, in which—

Figure 1 is a longitudinal section through the improved machine taken in the vertical plane indicated by the red line $x$, $x$, Fig. 1. Fig. 2 is a plan view of the cart.

Similar letters of reference indicate corresponding parts in both figures.

This invention is intended more especially for hauling shocks of hemp from the field, or other place where they may be, to the machinery which is to break them and prepare them for market, without disarranging or tangling the stalks.

Many hemp growers employ at this day the common hand breaks because they are portable and can readily be moved about from place to place, to the shocks of hemp, instead of taking the hemp to the machine.

My invention consists in a cart of a novel construction whereby the shocks of hemp can be moved about without disarranging or tangling the stalks, said cart is so constructed that it can be placed against the standing shocks, and these shocks secured to the cart before they are upset; then again in unloading the cart the shock can be placed in a standing position before it is detached from the cart as will be hereinafter fully described, thereby enabling me to take the shocks of hemp to the machine instead of the machine to the hemp.

To enable those skilled in the art to make and use my invention I will proceed to describe its construction and operation.

The stalks of hemp when cut, are carefully put up in bundles or shocks (weighing from two to three hundred pounds) and these shocks are bound so as to confine the stalks all together; the shocks are then left standing until it is desired to prepare them for the market. Great care is taken in shocking the stalks of hemp to keep the stalks even, so that in presenting them to the break the woody matter will be properly separated from the long fibers without tearing these fibers. Where the improved hemp breaking machinery is used, it is necessary to carry the hemp stalks to the machine, and care must be therefore taken not to disarrange the stalks in the shocks; to prevent this difficulty, and at the same time effect the transportation of the shocks readily I construct a cart in the following manner.

A. A. are two parallel beams which are secured at their rear ends to an axle tree B. carrying on each end a small wheel C. Beams A. A. are secured together with a suitable number of transverse bars D. D. D'. the latter of which extends across the front end of the beams and projects out from one side of the cart as represented in Fig. 1 forming a handle which is used in loading and unloading the cart, as will be hereinafter described. The width of this framework or cart body will be somewhat greater than the diameter of an ordinary sized shock of hemp, and its length from front to rear will be about as long as the stalks of hemp or shorter if desired.

To each side of the front end of the cart body and under the cross bar D'. the shafts or thills E. E. are pivoted by a bar F. having a handle on one end; which bar F. passes through the rear ends of the thills E. E. and through the front ends of the longitudinal side bars A. A.; the bar F., it will thus be seen, extends transversely across the cart body. This bar can be withdrawn at pleasure and the thills detached from the cart. Each end of the cross bar D'. projects out from the sides of the cart and the pivot connection of the thills with the cart frame is in rear of this cross piece so that the ends of cross bar D'. has a bearing on the thills when the cart is loaded.

About the middle of the length of the cart and under beams A. A. is a transverse roller G. working in suitable bearings. This roller projects out from one side of the cart a short distance and has a crank handle G'. attached to it for turning the roller by hand. A ratchet wheel $a$, is keyed to roller G. and a detent or pawl $b$, which is pivoted to the cart frame, engages with the wheel $a$, to prevent the roller from rotating backward when it is desired. One end of a strong rope or chain $c$, is secured to the roller G. on one side of the middle of the length of this roller and on the other end of said rope or chain a loop is formed which is attached to the hook $d$, on roller G. when the chain is passed around a shock of hemp as represented in red lines Fig. 1. of the drawings.

The operation of my improved machine is as follows: A horse is hitched up in thills E. and the machine drawn to a shock of hemp. The cart is now backed up against the standing shock and the cart frame is erected to a perpendicular position against the shock as represented in red lines Fig. 1; while the cart is in this position the chain c, is passed around the shock and attached to hook d. The roller G. is now turned until the shock is bound tightly to the cart; pawl b, prevents the chain from unwinding. The cart is now brought back to its original position and the shock of hemp is hauled to the desired place for its deposit, where the cart is raised to a perpendicular position again, and, when the shock rests on the ground, the chain c, may be loosened and the cart drawn away for another load.

I am aware that it is not new to apply a windlass to carts and wagons and I do not claim such as my invention, when taken separately or independently of the combination herein described.

What I do claim as new and desire to secure by Letters Patent, is,

A cart constructed with the thills pivoted at F. as herein set forth, and held in position when loaded by bar D'. in combination with the windlass G. and binding cord c, all being arranged as and for the purposes herein specified.

Z. FEAGAN.

Witnesses:
   CHARLES SWIFT, Sen.,
   WILLIAM H. PURSE.